United States Patent Office 3,453,468
Patented July 1, 1969

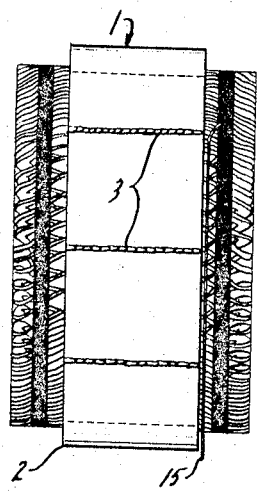
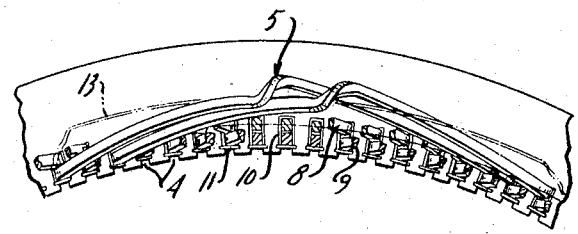
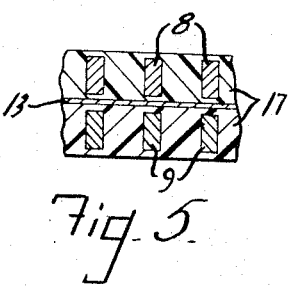
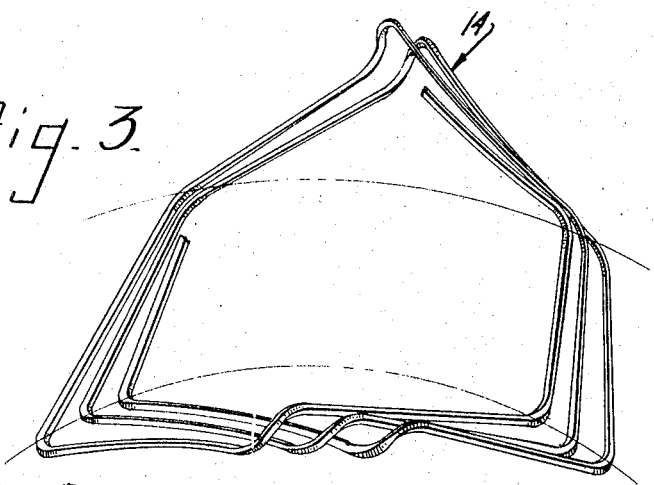
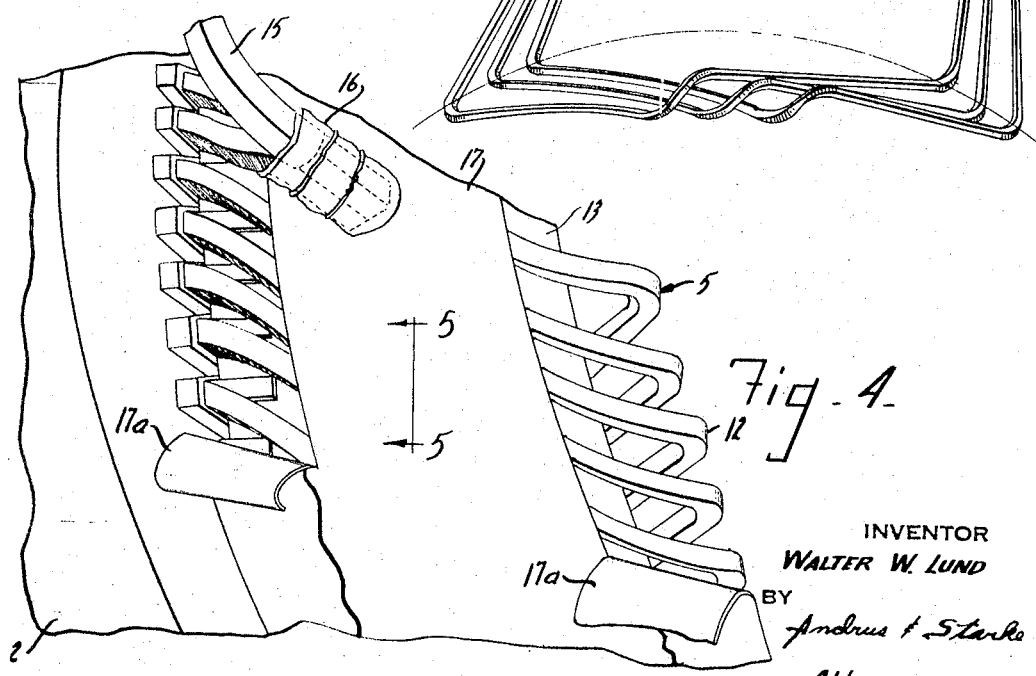

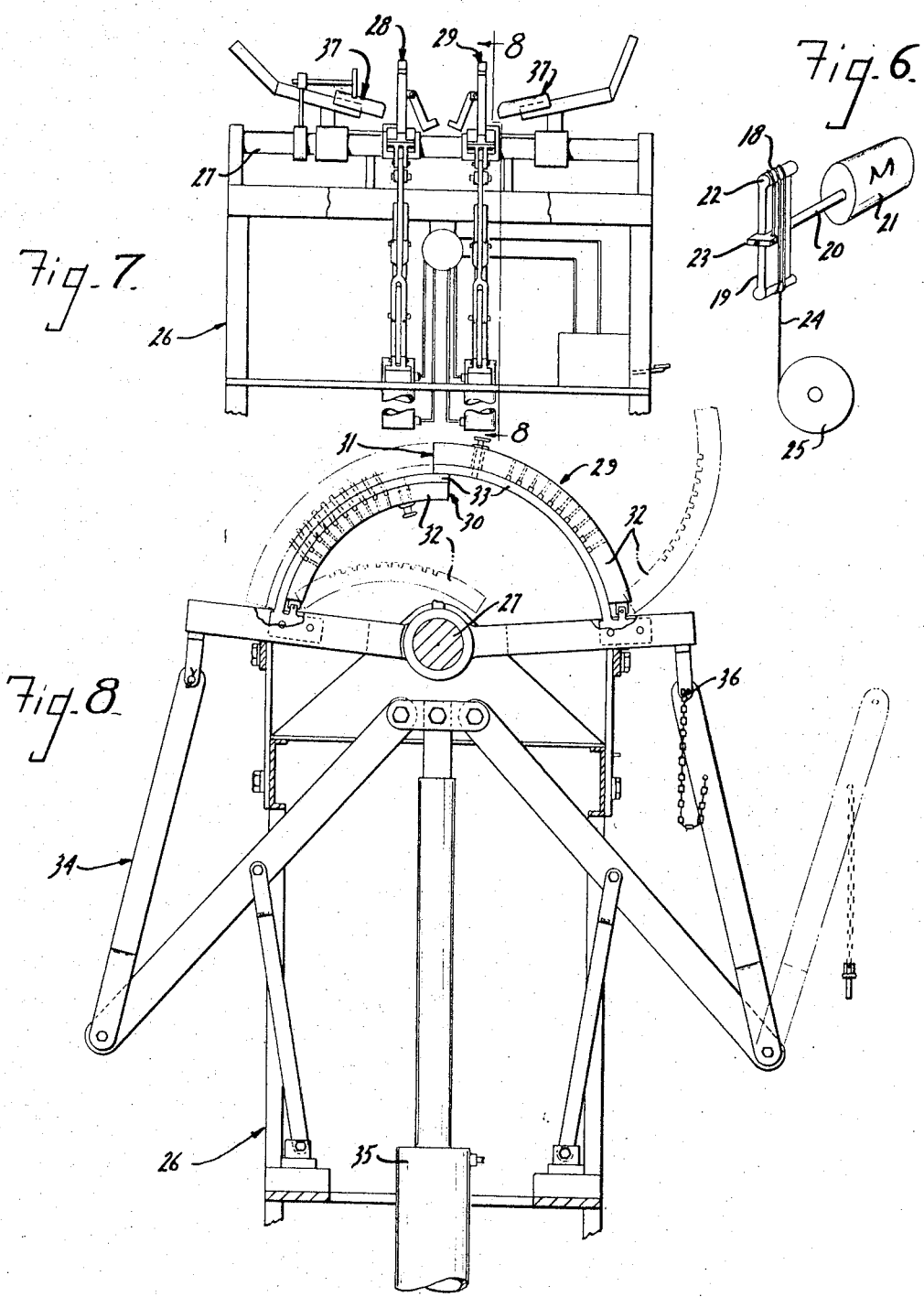

3,453,468
DYNAMOELECTRIC MACHINE WINDING ARRANGEMENT WITH END TURN INSULATION AND METHOD OF MAKING THE SAME
Walter W. Lund, Appleton, Wis., assignor to Kurz and Root Company, Inc., Appleton, Wis., a corporation of Wisconsin
Filed Sept. 21, 1966, Ser. No. 581,002
Int. Cl. H01f 5/06, 11/02, 15/12
U.S. Cl. 310—180                16 Claims

ABSTRACT OF THE DISCLOSURE

A two-layer winding arrangement for a dynamoelectric machine stator core having a plurality of coils wherein each phase group coils are series connected and formed from a single continuous conductor and wherein each coil consists of a single turn. The coil ends are essentially straight lengths and are solely supported by and bonded together with a band of epoxy resin with silica dust filler. The plastic band is located between the core and the outermost extensions of the coil ends so as not to interfere with cooling of the winding. The band is confined to this location by using a removable tape before applying the settable flowable potting material in a paste form. After the tape is removed the assembly may be dipped in varnish and baked.

---

This invention relates to an electromagnetic structure and to a method of making the same and particularly to the formation of an annular stator unit for alternators, synchronous motors and the like which have a relatively high rating.

Alternators, synchronous motors and the like may be constructed with an annular stator within which a rotating field is rotatably mounted. The stator construction particularly for larger rated alternators and the like includes an annular magnetic core having circumferentially distributed and axially extended stator slots. The winding consists of coils spanning the distance of a pole pitch and interconnected together to form groups in accordance with the phase connection; for example, a three phase winding. Each coil includes a multiple number of turns with adjacent turns being disposed in adjacent slots. The coils may be disposed in the slots with two sides per coil per stator slot. Each turn may be a plurality of series connected conductors of a relatively small diameter to provide the desired current carrying capacity. Alternatively, separate single coil turns are provided and disposed within the stator slots and after assembly within the stator slots are brazed to the adjacent turns to provide the desired series connection. Generally, the outer ends of the coil turns are secured to a supporting end ring.

Although highly satisfactory stator units can be constructed in this manner, the assembly is time consuming and requires skilled personnel. Thus, in making the brazed connection between the turns care must be taken not to damage the adjacent core as a result of the heating. Further, in such devices, the brazed connections are a possible fault location and a possible source of heat loss which reduce the efficiency. The interconnection of the several coil turns to the outer physical ring is also a relatively time consuming process which adds appreciably to the cost.

The present invention is particularly directed to a magnetic core structure such as the annular stator of an alternator wherein the several turns of a coil are formed as a continuous inetgrally connected conductor without brazed or other separate connections. A supporting material preferably an epoxy resin or the like is applied as a paste to the outer extensions of the coils. Upon setting, the material acts to physically support the outer ends of the coils and eliminates the necessity of the mechanical outer rings.

The windings are preferably formed by winding a continuous conductor into a multiple number of adjacent turns. While holding the portion of the coil adapted to mate with the stator slot against axial movement and allowing the outer ends to remain essentially unrestrained, relatively angular movement is established between the upper sides of each turn and the lower sides of each turn to displace the turn sides in accordance with the slot spacing. It has been found that by moving of the sides as a group relative to each other along an arc generally corresponding to that of the core structure, the outer ends automatically provide the desired forming and spacing. The outer ends can then be bent outwardly to produce the desired end flare.

The multiple turn coils are assembled with the stator core, with the desired slot and phase insulation. An epoxy resin paste or the like is then applied to the outer ends of the coils to provide the physical end support.

Thus, the present invention proviеds a highly improved stator unit and an improved method of forming the same. The structure of this invention has been found to provide a very economical and reliable means for accurately forming the windings in a rapid and efficient manner.

The drawings furnished herewith illustrate a preferred construction of the present invention in which the above advantages and features are clearly described and shown as well as others which will be clear from the following description.

In the drawings:

FIG. 1 is a side elevational view of an alternator stator unit constructed in accordance with the present invention:

FIG. 2 is an enlarged fragmentary end view of the stator unit with parts broken away and sectioned to more clearly show details of the invention;

FIG. 3 is a perspective view of a portion of a coil winding shown in FIGS. 1 and 2;

FIG. 4 is an enlarged fragmentary pictorial view of the end portion of the stator unit;

FIG. 5 is an enlarged section taken generally on lines 5—5 of FIG. 4;

FIG. 6 is a pictorial view of an apparatus for initial formation of a winding for subsequent formation into the configuration of FIG. 3;

FIG. 7 is a side elevational view of a coil pulling and stretching machine for forming of the winding as shown in FIG. 4; and FIG. 8 is an enlarged vertical section taken generally on line 8—8 of FIG. 7.

Referring to the drawings and particularly to FIG. 1, a stator unit 1 for an alternator of a rotating field type is illustrated constructed in accordance with the present invention. A suitable housing and rotor assembly, not shown, are assembled with the stator unit 1 in accordance with any known or desired design. Generally, the stator unit 1 includes an annular core 2 formed of a plurality of laminations interconnected and held together by a series of circumferentially distributed peripheral welds 3. A plurality of circumferentially distributed slots 4 are formed on the inner face of the annular core 2 within which a stator winding 5 is disposed. For purposes of discussion, it will be assumed that the stator winding 5 is a distributed three-phase winding and that there are several slots 4 per phase per pole and two coil sides per slot. The coils occupying corresponding slots under the poles, not shown, would be series connected to form a phase winding. Thus, each slot 4 includes an inner conductor 8 of one coil or turn of a phase winding coil group and an outer conductor 9 forming the side of another coil or turn of the other phase winding coil group, in accordance with known design. The coil turns are shown insulated from the core by slot liners 10. The slots are closed by slot pegs 11 which are driven in from the ends of the slots into suitable recesses formed in the side walls of the slots immediately adjacent the opening thereto. Insulating strips or pegs may be interposed between the coil sides in each of the slots. Each coil spans a full or partial pole with the coil sides connected by similar end extensions 12 which are specially constructed in this invention. An interphase insulation paper 13 is interposed between the inner coil sides and the outer coil sides in the end extensions 12.

In accordance with the present invention, each coil group is formed as a continuous integral conductor particularly having integral continuous end extensions, as most clearly shown in FIGS. 2–4.

In FIGS. 2 and 3, only two complete coils or turns are shown as a coil group 14 for purposes of clarity. In actual practice, a greater number of turns complete a coil group. Each turn is continuous with the next turn and are preformed with the coil sides circumferentially and radially spaced in accordance with the designed full or short pole pitch.

A plurality of the coil groups 14 are preformed, a preferable method and apparatus being hereinafter described and then assembled within the slots 4 of the stator core 2 with the flared outer end extensions 12 projecting generally axially of the core 2. The ends of the coil groups 14 are silver soldered to appropriate ends of the related spaced groups or to interconnecting leads 15 in accordance with the particular design. The soldered connections may be covered with suitable insulating sleeve 16 in accordance with general design considerations.

Further, during the assembly of the coil groups 14 to the stator core 2, the interphase insulating paper strips 13 are inserted or interleaved between the upper and lower sides of the turns to form a continuous loop of insulation.

In accordance with a significant aspect or feature of the present invention, the end extensions 12 are supported by a mass of plastic or similar material 17 which can be applied in paste form and set to a rigid mass. The material 17 forms the sole support for the extensions 12 without interfering with the cooling of the winding. This provides an exceptionally inexpensive support for the winding while maintaining operating characteristics.

Applicant has successfully used an epoxy resin 1066 with a silica dust filler thickening the resin material to a workable consistency. Silica dust was employed because of its highly satisfactory insulating characteristics.

In forming the stator unit, the material 17 is applied to the inner coil side extensions and to the outer coil side extensions in paste form and produces a plastic covering over the extensions. The material may or may not enclose the conductor as shown in FIG. 5.

In the illustrated embodiment of the invention, the supporting material spans only an intermediate portion of the outer turn extensions with the outermost extremities being free of any such material. Strips of tape 17a is applied to the winding prior to the application of the material 17 to establish the restricted application. Although such restriction application is not essential it minimizes material costs while providing highly satisfactory cooling of the winding and maintaining the fixed spaced relation of the turns to prevent short circuiting therebetween without the necessity of the usual end supporting ring. The space between the extensions of each turn or coil is extremely important to prevent voltage breakdown. Further, such support must be maintained over long periods of time associated with the normal long life of alternators and the like.

Applicant has found that the present invention provides an unusually satisfactory answer to the economical and reliable support of the winding.

The supporting material further acts as a guard reducing the danger associated with dirt falling in between After application and setting of the epoxy resin or other suitable supporting material, the stator unit may be dipped and baked in the conventional manner.

A highly satisfactory and novel apparatus for preforming the coil groups such as shown in FIG. 3 is briefly shown and described in FIGS. 6–8. A more complete description is set forth in the copending application of Walter W. Lund et al. filed on the same date as the present application and assigned to the same assignee as this application and entitled, Apparatus for Forming a Winding and assigned Ser. No. 581,001—obtained from the corresponding or related application which was filed on the same date as this application, namely Sept. 21, 1966.

An elongated unformed spiral coil group 18 is first formed with each coil or turn having a peripheral length corresponding to that of each coil in the final group. A simple and practical apparatus is shown in FIG. 6. A rotating plate-like arm 19 includes a center drive 20 connected to a rotating drive means 21. The outer end of the arms are rounded or enlarged as at 22 to define a diameter spacing of the inner and outer sides of each coil. A conductor clamp 23 is secured to the arm and is adapted to fixedly secure an end of a continuous conductor to the arm 19. A suitable conductor 24 which may be coated with a suitable insulating varnish, if desired, and which corresponds to the conductor of the stator winding is stored as a continuous conductor on a spool 25 or the like. The end of conductor 24 is secured to the arm 19 which is then rotated to wind the conductor thereon in a plurality of adjacent spiral coils or turns to form the unformed coil group 18 with the desired number of turns. The unformed coil group is severed by spool 25 and then removed from the winding machine and placed in a coil pulling and forming apparatus as shown in FIGS. 7 and 8.

Generally, the illustrated embodiment of the pulling and forming machine is symmetrical about a vertical plane through FIG. 7 to similarly form the opposite ends or halves of the coil group and consequently the one half of the machine will be described with the corresponding elements of the other half identified by similar primed numbers for simplicity and clarity of explanation.

Generally, the illustrated mechanism includes an open supporting framework 26 having a pivot support shaft 27 secured to the upper end of the open frame. A pair of similar pulling and stretching units 28 and 29 are secured to the shaft 27 and spaced axially from each other in accordance with the axial length of the core 2. Each unit includes a lower stretch arm assembly 30 and an upper stretch arm assembly 31 pivotally secured to the sides of shaft 27 and adapted to grasp the group 18 of continuous coils immediately adjacent the portion of the coils mating with the one end of the slots, as most clearly shown in FIG. 8.

The illustrated stretching mechanism is particularly the subject matter of the previously referred to copending application and is therefore only shown and briefly described herein to show one method of forming the continuous coil group of FIG. 3. For a more detailed explanation, reference is made to the copending application.

The arm assemblies 30 and 31 are adapted to be telescoped over each other as shown in phantom in FIG. 8. Each assembly includes a pivotally mounted notched arm 32 within which the coil sides are suitably clamped by a correspondingly shaped clamping plate 33 to prevent movement of the coil sides during the pulling operation.

A suitable linkage 34 connects the outer ends of the arm assemblies 30 and 31 to a common hydraulic actuator 35 for pivotally positioning the arm assemblies. The linkage 34 to arm assembly 31 includes a releasable pinned connection 36 to free the assembly for telescop- In assembly, the unformed coil group 18 is inserted in the one arm assembly 30 and the second arm assembly 31 telescoped into the coil group and clamped in place. The overlying arm assemblies 30 and 31 are then centered over the shaft 27 and simultaneously pivoted in opposite directions at the same speed to pull the coil sides laterally to the position of FIG. 3.

While supporting the pulled coils in the arm assemblies, the outer ends are flared by suitable pivotal mounted deforming plates 37 shown in FIG. 7.

A plurality of the coil groups are so formed and assembled with the core 2 and with the slot and interphase insulating end winding strips. The spaced strips of protective paper or tape 17a is applied to the inner and outer surfaces of the end extensions 12 to define the intermediate portion to which the supporting material 17 is to be applied. The material 17 then applied as a paste or the like and allowed to sit. The tape strips 17a are then removed and the terminal connections made. The completed stator unit may then be dipped and baked in a known manner before assembly with the housing and other components.

The material 17 provides a reliable support for the winding 5 and the continuous conductors of the winding groups provide an improved winding and method of forming the stator unit.

The illustrated winding is formed from a single conductor. In practice, the winding may be made from two or more side-by-side conductors simultaneously formed as a single unit in accordance with the previous description. Thus, for example, referring to FIG. 6, a pair of conductor spools would be provided and the two conductors clamped to the plate arm and simultaneously wound in a sub-group of coils or turns of side-by-side conductors.

The present invention thus provides an improved electromagnetic stator construction for an alternator or the like which can be constructed in a rapid and economical manner.

Various modes of carrying out the invention are contemplated as being within the scope of the following claims particularly pointing out and distinctly claiming the subject matter which is regarded as the invention.

I claim:

1. In a dynamoelectric machine including a stator winding having series connected multiple turns with the sides of each turn being similarly located in circumferentially distributed slots in a circular stator core, each turn within each slot consisting of a single series generally self-supporting conductor means passing from one slot directly to a different slot, the improvement comprising having a plurality of said turns as a continuous and integral generally self-supporting conductor means without soldered connections and the like between the several turns.

2. The assembly of claim 1 wherein the end portions of the turns connecting the sides of the turns are disposed outwardly of the core, and a potting material bonded about an intermediate portion spaced from the core and from the outermost extensions of the end portions to physically support the ends and prevent relative movement between the individual turns.

3. The assembly of claim 2 wherein said potting material is an epoxy resin including an insulating solid filler.

4. The assembly of claim 2 wherein said potting material is a resin and silica dust mixture.

5. The assembly of claim 2 wherein said potting material is a band of plastic encircling the ends with the conductors disposed in the plastic, said band forming the sole support for said ends.

6. The assembly of claim 2 wherein said core is an annular core having axial slots on the inner periphery, said winding having each turn essentially identical to each other turn and each turn having sides disposed in the slots and outer end extensions connecting the sides, said end extensions being substantially uniformly spaced and flared outwardly.

7. The assembly of claim 6 wherein said potting material is a mixture of a resin and a filler.

8. The assembly of claim 6 wherein said potting material is a mixture of an epoxy resin and silica dust.

9. In a stator unit for an alternator or the like, a winding including series connected multiple turns disposed in circumferentially distributed slots of an annular core with the ends connecting the sides of the turns disposed outwardly of the core, and a potting material bonded about the ends in spaced relation to the core and the outermost extension of these ends to form the sole physical support of the ends to prevent relative movement between the individual turns while maintaining necessary cooling thereof.

10. The method of winding an annular core having circumferentially distributed slots, including the steps of forming the windings in a plurality of coil groups, each group consisting of a plurality of single turns with each group being a continuous and integral conductor means, said turns having inner and outer sides connected by end portions, assembling the coil groups with the core, applying a settable flowable material to the end portions to provide physical support for the end portions, covering the outer ends of said end portions with a removable cover to prevent application of said material thereto and removing of said cover after applying said material.

11. In the method of claim 10 including a further step of applying an insulating varnish to the core and winding.

12. The method of winding an annular core of claim 10 wherein said flowable material is applied as a paste to the inner coil sides and outer coil sides of the end portions.

13. The method of claim 10 including the steps of forming said flowable material into a paste-like mixture of a plastic resin and an insulating solid filler material.

14. The method of claim 10 including the step of forming said flowable material into a paste-like mixture of an epoxy resin and silica dust.

15. The method of claim 10 including the steps prior to applying the settable flowable material to the end portions of applying a tape cover to the end portions with an axially intermediate portion of the end portions exposed to receive said material, and after applying the material removing said tape to establish a supporting band of material.

16. A winding for an annular stator core, comprising a plurality of single turns formed of a continuous conductor having integral end connections between the sides of the turns, said turns having corresponding upper and lower sides essentially parallel to each other and correspondingly spaced end extensions connected by essentially straight lengths joined at the outermost ends.

References Cited

UNITED STATES PATENTS

| | | | |
|---|---|---|---|
| 1,488,873 | 4/1924 | Francis | 310—180 |
| 2,071,977 | 2/1937 | Herrick | 310—208 |
| 2,367,079 | 1/1945 | Wiest | 310—180 |
| 2,749,460 | 6/1956 | Acton et al. | 310—260 |
| 2,961,555 | 11/1960 | Towne | 310—260 X |
| 2,994,735 | 8/1961 | Marshall et al. | 310—260 X |
| 3,002,119 | 9/1961 | Lindstrom | 310—260 |
| 3,151,260 | 9/1964 | MacCracken | 310—260 X |

WARREN E. RAY, Primary Examiner.

U.S. Cl. X.R.

29—596; 310—201, 208, 260